US008818676B2

(12) United States Patent
Peng et al.

(10) Patent No.: US 8,818,676 B2
(45) Date of Patent: Aug. 26, 2014

(54) REDUNDANT TORQUE SECURITY PATH

(75) Inventors: Jinchun Peng, Ann Arbor, MI (US); Timothy J. Hartrey, Brighton, MI (US)

(73) Assignee: GM Global Technology Operations LLC

(*) Notice: Subject to any disclaimer, the term of this patent is extended or adjusted under 35 U.S.C. 154(b) by 511 days.

(21) Appl. No.: 11/417,310

(22) Filed: May 2, 2006

(65) Prior Publication Data

US 2007/0260389 A1 Nov. 8, 2007

(51) Int. Cl.
*B60W 10/00* (2006.01)

(52) U.S. Cl.
USPC ............... 701/84; 701/36; 701/54; 701/58; 701/59; 701/70; 701/99; 701/101; 701/104; 701/106; 701/29.1; 701/31.9; 701/33.7; 701/33.9

(58) Field of Classification Search
USPC .............................................. 700/48
See application file for complete search history.

(56) References Cited

U.S. PATENT DOCUMENTS

| | | | | |
|---|---|---|---|---|
| 5,394,327 A | * | 2/1995 | Simon et al. | 701/1 |
| 6,070,118 A | * | 5/2000 | Ohta et al. | 701/65 |
| 6,125,314 A | * | 9/2000 | Graf et al. | 701/53 |
| 6,256,575 B1 | * | 7/2001 | Sans | 701/102 |
| 7,004,141 B2 | * | 2/2006 | Matthews et al. | 123/295 |
| 7,177,743 B2 | * | 2/2007 | Roy | 701/36 |
| 7,181,334 B2 | * | 2/2007 | Kropinski et al. | 701/106 |
| 7,389,773 B2 | * | 6/2008 | Stewart et al. | 123/672 |
| 2003/0205867 A1 | * | 11/2003 | Coelingh et al. | 280/5.5 |
| 2003/0218439 A1 | * | 11/2003 | Gabriel et al. | 318/433 |
| 2004/0034460 A1 | * | 2/2004 | Folkerts et al. | 701/54 |
| 2004/0098228 A1 | * | 5/2004 | Hartrey | 702/184 |
| 2004/0182374 A1 | * | 9/2004 | Surnilla | 123/674 |
| 2004/0249533 A1 | * | 12/2004 | Wheals et al. | 701/36 |
| 2006/0036911 A1 | * | 2/2006 | Costin et al. | 714/25 |
| 2006/0080025 A1 | * | 4/2006 | Wang et al. | 701/106 |
| 2006/0212209 A1 | * | 9/2006 | Cesario et al. | 701/106 |
| 2006/0293841 A1 | * | 12/2006 | Hrovat et al. | 701/205 |
| 2007/0050112 A1 | * | 3/2007 | Kroehnert et al. | 701/41 |
| 2007/0288140 A1 | * | 12/2007 | Wheals et al. | 701/36 |

* cited by examiner

*Primary Examiner* — Jonathan M Dager

(57) ABSTRACT

An engine control system includes a torque request control module to determine a first engine torque request. An artificial neural network (ANN) torque request module determines a second engine torque request using an ANN model. A torque security check module that selectively generates a malfunction signal based on the difference between the first engine torque request and the second engine torque request.

12 Claims, 5 Drawing Sheets

REDUNDANT TORQUE SECURITY PATH

FIELD OF THE INVENTION

The present invention relates generally to vehicles, and more specifically to a redundant torque security path in vehicles.

BACKGROUND OF THE INVENTION

Traditionally, automobiles are driven by an internal combustion engine that produces torque. A torque request is generated based on driver input, such as an accelerator pedal or a cruise control system, and a vehicle speed. The torque request is communicated by a torque control path to regulate the engine output torque.

In some vehicles, the torque control path is supplemented by a torque control security path due to vulnerability in processor-based control systems and the potential for various electronic failures. However, the torque security control path could fail to detect malfunctions in the torque control path due to the common failure modes in the algorithm formulation, algorithm calculations, and/or arithmetic logic unit (ALU) usage.

SUMMARY OF THE INVENTION

Accordingly, an engine control system includes a torque request control module to determine a first engine torque request. An artificial neural network (ANN) torque request module determines a second engine torque request using an ANN model. A torque security check module selectively generates a malfunction signal based on the difference between the first engine torque request and the second engine torque request. A torque security check module selectively generates a malfunction signal based on a difference between the first engine torque request and the second engine torque request.

In one feature, the first and second engine torque requests are based on a cruise torque request signal, an engine speed signal, and a pedal position signal.

In another feature the engine control system includes a torque control module that outputs a control signal to an engine system to generate the first engine torque request.

In still another feature, the torque security check module generates the malfunction signal if the difference between the first torque request and second torque request is greater than a predetermined value. The ANN model is updated when the difference between the first engine torque and the second engine torque is less than the predetermined value.

In yet another feature, the engine control system includes a shutdown module that generates a shutdown signal for a fuel injection system upon receiving the malfunction signal.

In one feature, the ANN model comprises a particle swarm optimization algorithm that is used when said ANN model is updated. The ANN model is a feed-forward system. The ANN model receives an acceleration pedal position input, an engine speed input, and a cruise request input. In yet another feature, an engine system includes the engine control system and an engine control module that includes the torque request control module, the ANN torque request module, and the torque security check module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. As used herein, the term module or device refers to an application specific integrated circuit (ASIC), an electronic circuit, a processor (shared, dedicated, or group) and memory that executes one or more software or firmware programs, a combinational logic circuit, and/or other suitable components that provide the described functionality.

According to the present invention, the torque control security path is independent of the torque control path to avoid common failure modes. More specifically, the torque control security path is independent from the torque control path in terms of input signal acquisition, algorithm formulation, algorithm calculation, and/or ALU usage. In some implementations, an artificial neural network (ANN) model is used to decouple the torque control security path from the torque security path. The ANN model is designed to emulate the neural structure of the brain. The ANN model recognizes patterns in a collection of data through a learning process and produces a desired output for that data.

Figure 1:
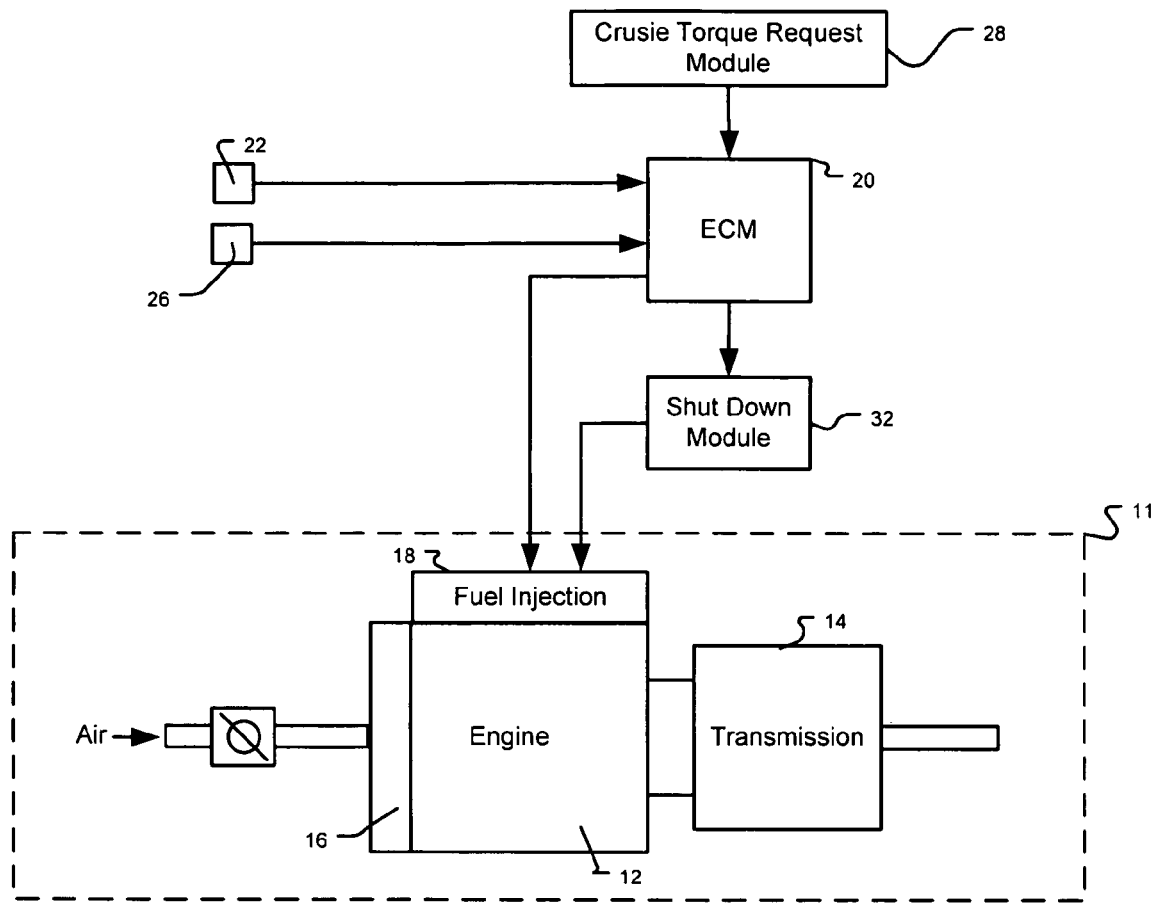
FIG. 1 illustrates a functional block diagram of an engine system according to the present invention.

Referring now to FIG. 1, an engine system 11 includes an engine 12 and a transmission 14. The engine 12 produces drive torque to drive the transmission 14. More specifically, the engine 12 draws air into an intake manifold 16 and distributes the air to cylinders (not shown) where it is combined with fuel to form an air/fuel mixture. A fuel injector (not shown) injects fuel that is combined with air as it is drawn into the cylinder. The fuel injector may be an injector associated with an electronic or mechanical fuel injection system 18. The fuel injection system 18 is controlled to provide a desired air-to-fuel (A/F) ratio within each cylinder.

An engine control module (ECM) 20 generates a drive torque request using data from a pedal position sensor 22, a vehicle speed sensor 26 and a cruise torque request module 28. It can be appreciated that the ECM 20 may include one or more control modules. The ECM 20 communicates with a shutdown module 32 that disables the fuel injection system 18 during a torque request malfunction.

Figure 2:
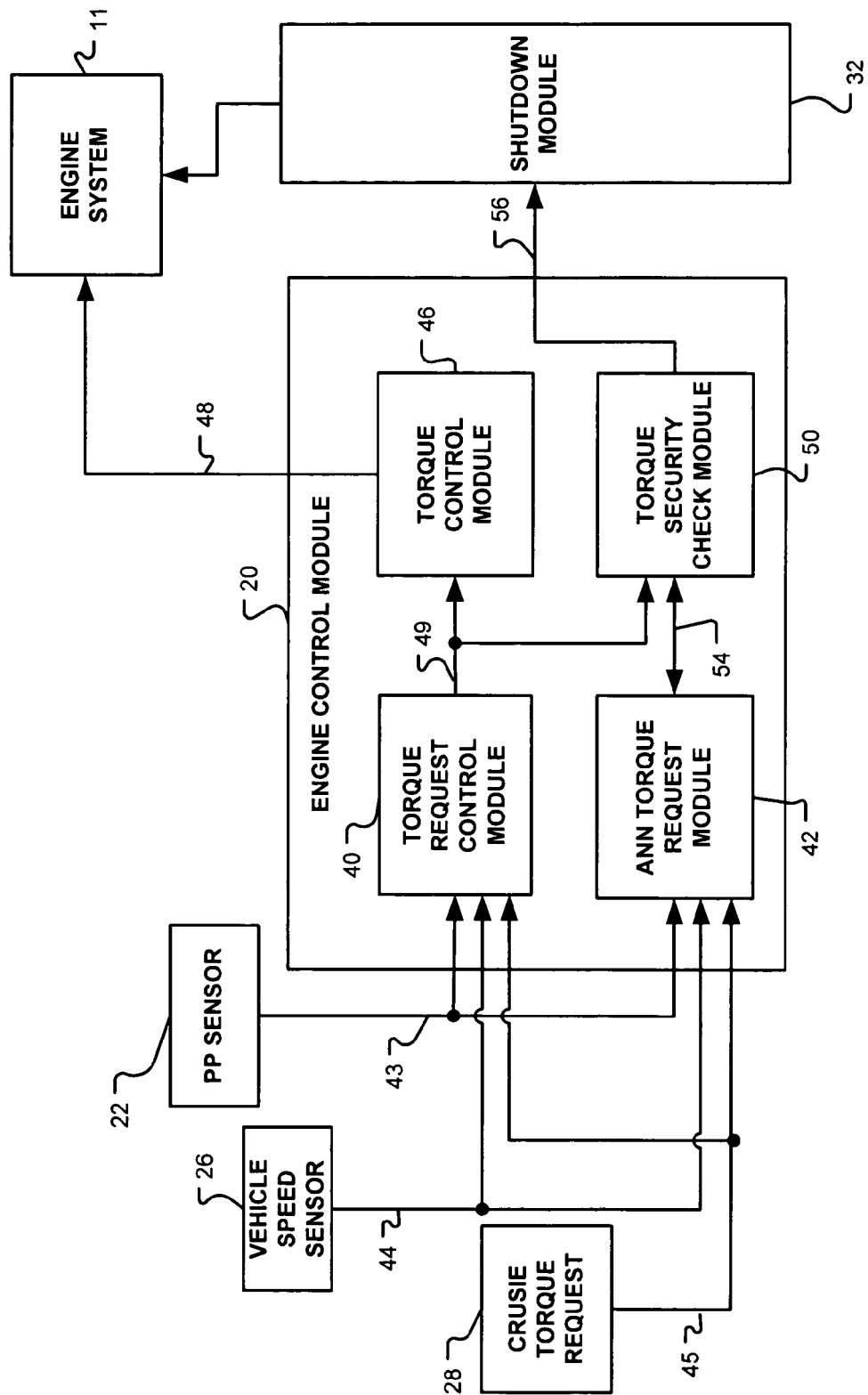
FIG. 2 illustrates a functional block diagram of the engine control module (ECM) according to the present invention.

Referring now to FIG. 2, the ECM 20 includes a torque request control module 40 and an ANN torque request module 42. The torque request control module 40 determines a first engine torque request in a conventional manner based on a pedal position signal 43, a vehicle speed signal 44 and a cruise torque request signal 45. The ANN torque request module 42 determines a second engine torque request by processing the pedal position signal 43, the vehicle speed signal 44 and the cruise torque request signal 45 through an ANN model. A torque control module 46 outputs a control signal 48 to the engine system 11 to generate the first engine torque request. A torque security check module 50 receives a torque request signal 49 from the torque request control module 40, and an ANN torque request signal 54 from the ANN torque request module 42. The torque security check module 50 selectively determines a torque request malfunction. The ANN model is updated based on a difference between the torque requests from modules 40 and 42. It can be appreciated that a variety of artificial neural network (ANN) configurations exist.

When the malfunction condition occurs, the torque security check module 50 outputs a malfunction signal 56 to the shutdown module 32. The shutdown module 32 disables the fuel injection system 18 to power down the engine 11.

Figure 3:
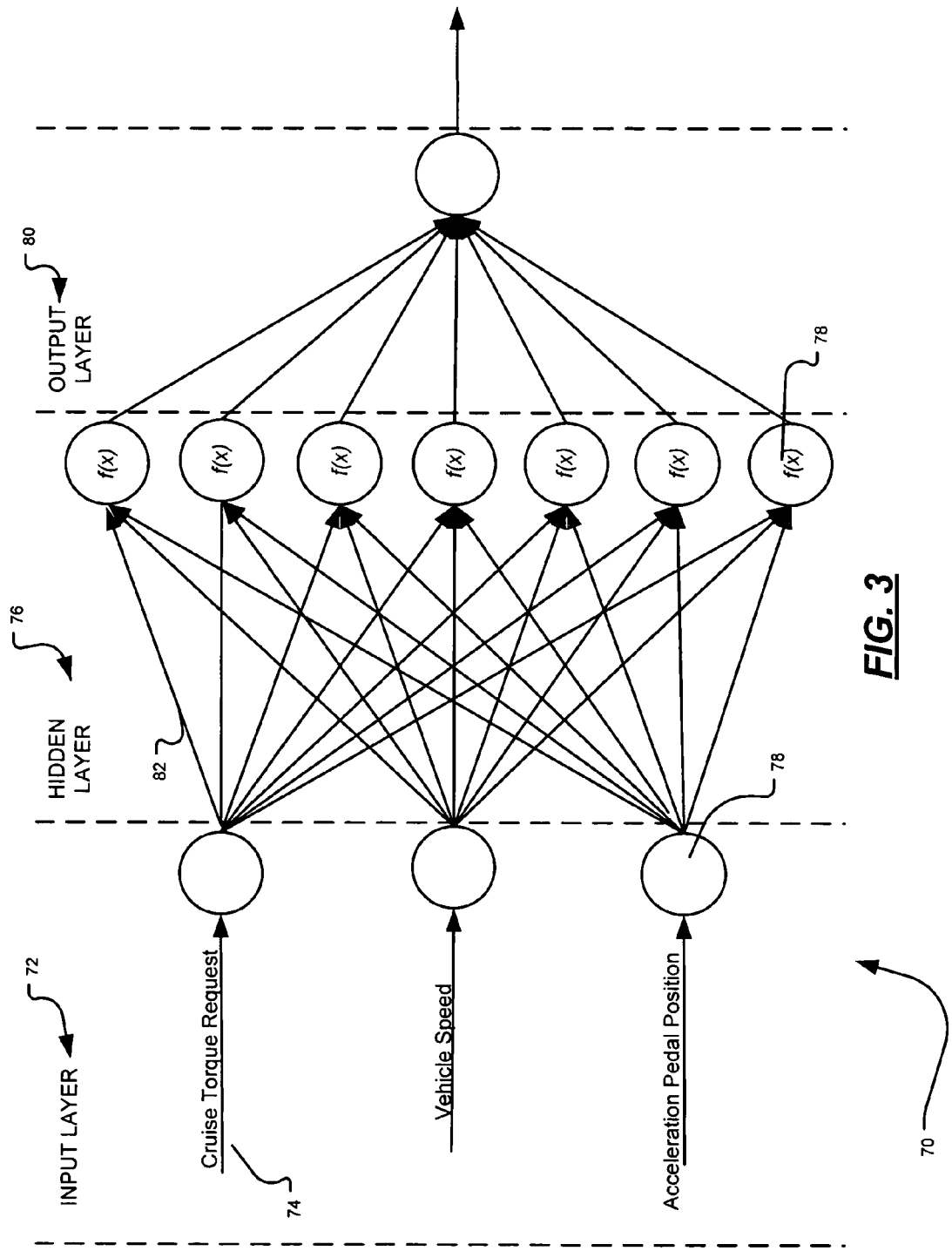
FIG. 3 illustrates an artificial neural network (ANN) model according to the present invention.

Referring now to FIG. 3, an ANN model 70 is an example of a feed-forward network according to the present invention. A feed-forward network is based on sequential movement of data through layers of the ANN model 70. An input layer 72 receives input parameters 74 such as vehicle speed, cruise torque request, and acceleration pedal position. A middle layer 76, also known as a hidden layer, uses the multiplication of the input parameters 74 and the corresponding weights 82 in a plurality of functions 78. The output layer 80 calculates an output based on the forwarded calculations from the middle layer 76.

A plurality of weights 82 connects a plurality of nodes 78 between layers in the ANN model 70. The weights 82 each contain a specific value. The weights 82 allow the ANN model 70 to influence different nodes 78 based on past learning experience.

During the development phase, the ANN 70 model is trained off-line using training sets or on line on the vehicle. In off-line training, the torque request is determined according to pre-determined input parameter values, which are based on measured values from real vehicle operations. The corresponding torque requests are recorded and integrated with the input parameter values to become the training sets. The ANN model 70 processes the training sets to develop learning patterns. The learning patterns are developed by adjusting the weights 82 in the ANN model 70 so that the output by the ANN model 70 equals the determined torque request of the training set.

In on-line training (normal vehicle operation), the ANN model 70 determines the torque request based on an acceleration pedal position signal 43, a vehicle speed signal 44, and a cruise torque request signal. The learning patterns are developed, during normal vehicle operation, by adjusting the weights 82 in the ANN model 70 so that the output by the ANN model 70 approaches the torque request output from the torque request module. In the real vehicle operation. The ANN model 70 will use its learning patterns developed from previous trainings to determine the torque request.

Figure 4:
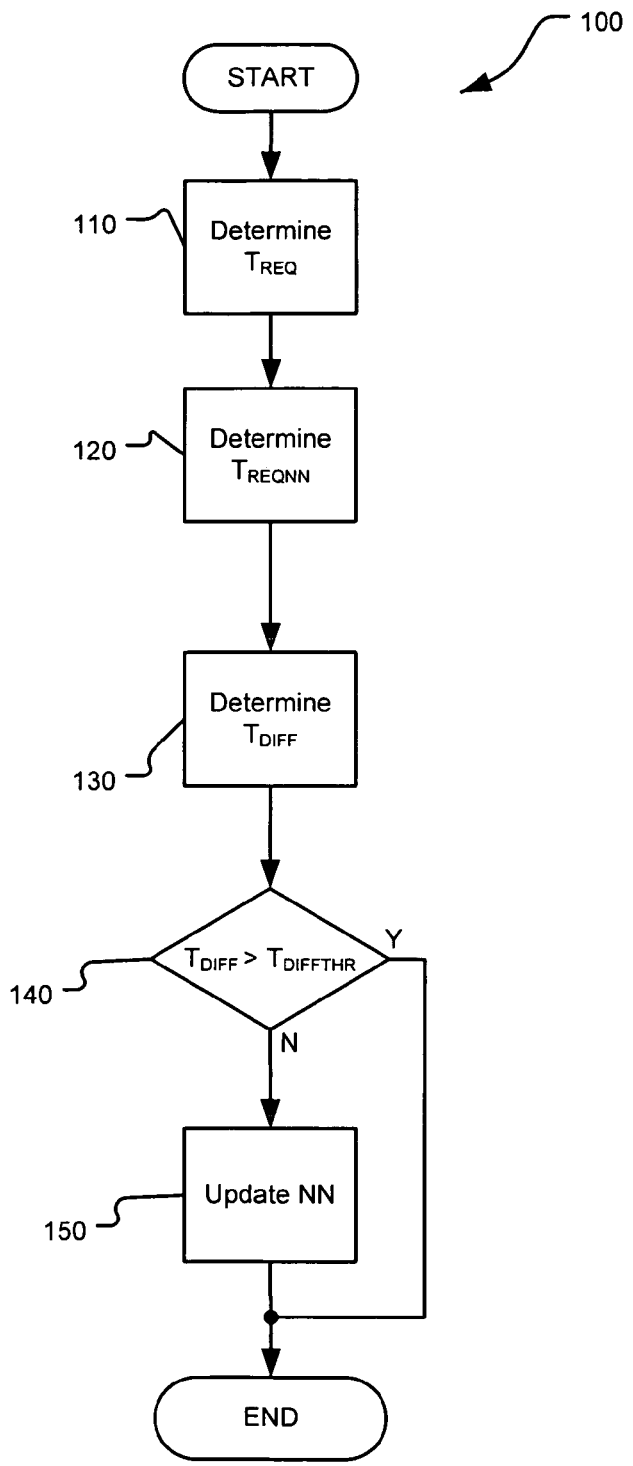
FIG. 4 is a flow chart illustrating steps for updating the ANN model according to the present invention.

Referring now to FIG. 4, a flowchart illustrates the steps of training the ANN model 70 during according to the present invention. In step 110, the torque request control module 40 determines a torque request in a conventional manner ($T_{REQ}$). In step 120, the neural network torque request module 42 determines a torque request through the ANN model 70 ($T_{REQNN}$). In step 130, control calculates the torque request difference ($T_{DIFF}$). More specifically, $T_{DIFF}$ may be a value calculated by the subtracting $T_{REQ}$ and $T_{REQNN}$, or a value calculated by finding a percent difference between $T_{REQ}$ and $T_{REQNN}$. In step 140, control determines whether $T_{DIFF}$ is less than a predetermined threshold value ($T_{DIFFTHR}$). If $T_{DIFF}$ is less than $T_{DIFF}$ THR control proceeds to step 150, otherwise control terminates. In step 150, then ANN model 70 adjusts the weights 82 based on $T_{DIFF}$. This allows the torque request determined by ANN model 70 to adjust to the torque request determined by the torque request module 40.

Figure 5:
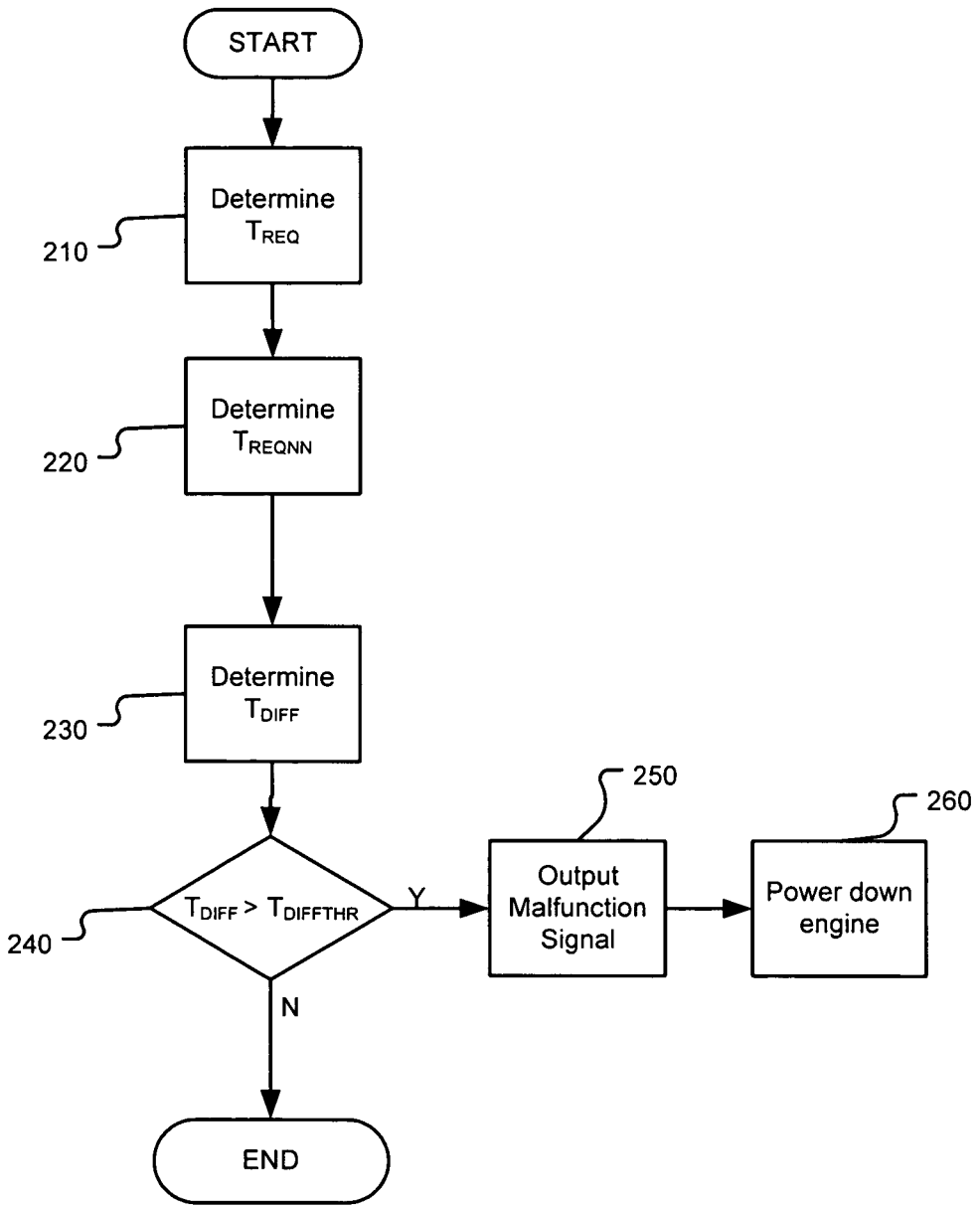
FIG. 5 is a flow chart illustrating steps for determining a torque request malfunction.

Referring now to FIG. 5, a flowchart illustrates the steps of determining a torque request malfunction according to the present invention. In step 210, the torque request control module 40 determines a torque request in a conventional manner ($T_{REQ}$). In step 220, the neural network torque request module 42 determines a torque request through the ANN model 70 ($T_{REQNN}$). In step 230, control calculates the torque request difference ($T_{DIFF}$). More specifically, $T_{DIFF}$ may be a value calculated by the subtracting $T_{REQ}$ and $T_{REQNN}$, or a value calculated by finding a percent difference between $T_{REQ}$ and $T_{REQNN}$. In step 240, $T_{DIFF}$ is compared to $T_{DIFFTHR}$, which establishes a boundary between a malfunction condition and a normal condition in the torque request control path. If $T_{DIFF}$ is greater than $T_{DIFFTHR}$, control generates the malfunction signal 56 in step 250, otherwise control terminates. In step 260, control disables the fuel injection system 18 to power down the engine 12.

An algorithm known as particle swarm optimization (PSO) may be implemented in the ANN model 70. The PSO algorithm models the social behavior of organisms such as a flock of birds, or a school of fish. More specifically, PSO considers the experience of a neighboring element to make use of the best outcome encountered by itself and its neighbor. Thus, PSO combines search methods attempting to balance exploration and exploitation to optimize a solution.

For example, when the torque security check module 50 determines an update condition for the ANN model 70, a PSO algorithm is used. The ANN model 70 has a range of values for each of the weights 82. The PSO algorithm picks values for each of the weights 82 based on its previous learning patterns. The values of the weights 82 that produce an output closest to the torque request are used as the basis for setting new values for each of the weights 82. In this manner, the PSO will ultimately reach an optimum value for each of the weights 82.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:
1. An engine control system comprising:
a torque request control module that determines a first engine torque request based on an accelerator pedal position, a vehicle speed, and a cruise torque request;
a torque control module that controls an engine to generate the first engine torque request;
an artificial neural network (ANN) torque request module that determines a second engine torque request using an ANN model, the determination of the second engine torque request using the ANN model including:
determining calculated values as functions of products of the accelerator pedal position, the vehicle speed, and the cruise torque request multiplied by corresponding weights; and
determining the second engine torque request based on the calculated values; and a torque security check module that selectively generates a malfunction signal based on a difference between the first engine torque request and the second engine torque request, wherein the torque control disables a fuel injection system of the engine when the malfunction signal is generated.

2. The engine control system of claim 1 wherein the torque security check module generates the malfunction signal when the difference is greater than a predetermined value.

3. The engine control system of claim 1 wherein the ANN torque request module updates at least one of the weights when the difference is less than a predetermined value.

4. The engine control system of claim 3 wherein the ANN torque request module updates at least one of the weights to adjust the second engine torque request toward the first engine torque request.

5. The engine control system of claim 3 wherein said ANN torque request module updates at least one of the weights using a particle swarm optimization algorithm.

6. The engine control system of claim 1 wherein the torque security check module determines the difference by subtracting one of the first and second engine torque requests from the other one of the first and second engine torque requests.

7. An engine control method comprising:

determining a first engine torque request based on an accelerator pedal position, a vehicle speed, and a cruise torque request;

controlling an engine to generate the first engine torque request;

determining a second engine torque request using an artificial neural network (ANN) model, the determination of the second engine torque request using the ANN model including:
  determining calculated values as functions of products of the accelerator pedal position, the vehicle speed, and the cruise torque request multiplied by corresponding weights; and
  determining the second engine torque request based on the calculated values; and selectively generating a malfunction signal based on a difference between the first engine torque request and the second engine torque request; and disabling a fuel injection system of the engine when the malfunction signal is generated.

8. The engine control method of claim 7 further comprising generating the malfunction signal when the difference is greater than a predetermined value.

9. The engine control method of claim 7 further comprising updating at least one of the weights when the difference is less than a predetermined value.

10. The engine control method of claim 9 further comprising updating at least one of the weights to adjust the second engine torque request toward the first engine torque request.

11. The engine control method of claim 9 further comprising updating at least one of the weights using a particle swarm optimization algorithm.

12. The engine control method of claim 7 further comprising determining the difference by subtracting one of the first and second engine torque requests from the other one of the first and second engine torque requests.

* * * * *